United States Patent
Clauw et al.

(10) Patent No.: US 7,507,008 B2
(45) Date of Patent: Mar. 24, 2009

(54) ACCESSORY LIGHT

(75) Inventors: Mitchell J. Clauw, Sterling Heights, MI (US); Chi-han Chen, Rochester Hills, MI (US); Jeffrey C. Dennis, Sterling Heights, MI (US); Nicholas J. Novak, Livonia, MI (US); George Walczowski, Chesterfield, MI (US)

(73) Assignee: Chrysler LLC, Auburn Hills, MI (US)

( * ) Notice: Subject to any disclaimer, the term of this patent is extended or adjusted under 35 U.S.C. 154(b) by 144 days.

(21) Appl. No.: 11/668,101

(22) Filed: Jan. 29, 2007

(65) Prior Publication Data

US 2008/0180963 A1    Jul. 31, 2008

(51) Int. Cl.
*B60Q 1/00* (2006.01)
(52) U.S. Cl. .................. 362/489; 362/487; 362/488
(58) Field of Classification Search .............. 362/487, 362/488, 489
See application file for complete search history.

(56) References Cited

U.S. PATENT DOCUMENTS

| | | | |
|---|---|---|---|
| 6,179,453 B1 * | 1/2001 | McMahon | 362/490 |
| 6,472,771 B1 * | 10/2002 | Frese et al. | 307/10.1 |
| 6,652,128 B2 | 11/2003 | Misaras | |
| 6,905,219 B2 * | 6/2005 | Gaides | 362/23 |
| 6,975,439 B2 | 12/2005 | Thomason et al. | |
| 7,210,829 B2 * | 5/2007 | Okazaki et al. | 362/489 |

* cited by examiner

*Primary Examiner*—Sandra O'Shea
*Assistant Examiner*—James W Cranson
(74) *Attorney, Agent, or Firm*—Ralph E. Smith

(57) ABSTRACT

A lighting system for a vehicle including a display panel and vehicle accessory includes a light source disposed within the display panel that illuminates the display panel. The display panel includes at least one aperture that selectively permits light from the light source to pass through the display panel to illuminate the vehicle accessory.

20 Claims, 4 Drawing Sheets

ACCESSORY LIGHT

FIELD OF THE INVENTION

The present invention relates to lighting systems and more particularly to a lighting system for a vehicle accessory.

BACKGROUND OF THE INVENTION

Lighting systems are conventionally used in vehicles to illuminate various areas around and within a vehicle. Exterior lighting systems are used to illuminate an area generally surrounding a vehicle to assist a driver in operating the vehicle in dark conditions while interior lighting systems are used to illuminate interior components of the vehicle to allow occupants within the vehicle to operate and control the vehicle and various subsystems. For example, an instrument panel of a vehicle may include a light source that illuminates a display opposing a driver as well as various controls such as audio system controls and/or heating, ventilation, and air conditioning system controls. Illuminating displays and/or controls enhances operation of the vehicle by allowing use of such displays and/or controls in dark conditions.

While conventional lighting systems adequately illuminate interior components of a vehicle such as an instrument panel, conventional lighting systems are typically dedicated to a particular component or vehicle subsystem. Because conventional lighting systems are typically dedicated to a specific component of a vehicle such as an instrument panel or instrument cluster and are not typically shared between vehicle subsystems, such lighting systems increase the overall complexity and cost of the vehicle.

SUMMARY OF THE INVENTION

A lighting system for a vehicle including a display panel and vehicle accessory includes a light source disposed within the display panel that illuminates the display panel. The display panel includes at least one aperture that selectively permits light from the light source to pass through the display panel to illuminate the vehicle accessory.

A vehicle is provided and includes a display panel, a vehicle accessory disposed adjacent to the display panel, and a lighting system disposed within the display panel that selectively illuminates the display panel and the vehicle accessory.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
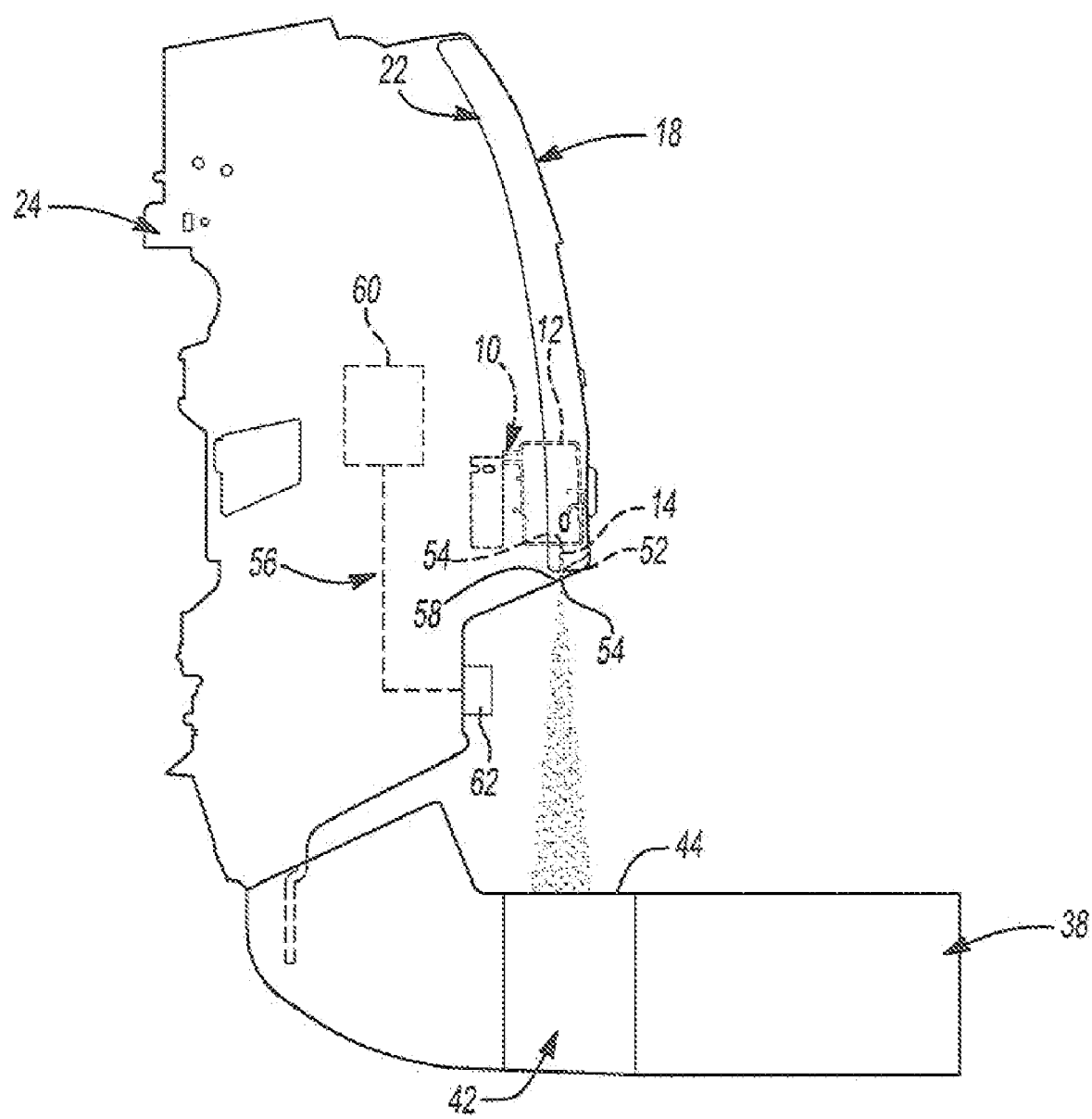
FIG. 1 is a side view of a vehicle accessory light in accordance with the principles of the present invention.

The following description is merely exemplary in nature and is in no way intended to limit the invention, its application, or uses.

With reference to the figures, a light system 10 is provided and includes a light source 12 and a light guide 14. The light guide 14 is disposed proximate to the light source 12 and directs light from the light source 12. The lighting system 10 may be incorporated into a vehicle 16 having a display 18 and a vehicle accessory 20 and may cooperate with the vehicle 16 to illuminate the display 18 and vehicle accessory 20.

Figure 2:
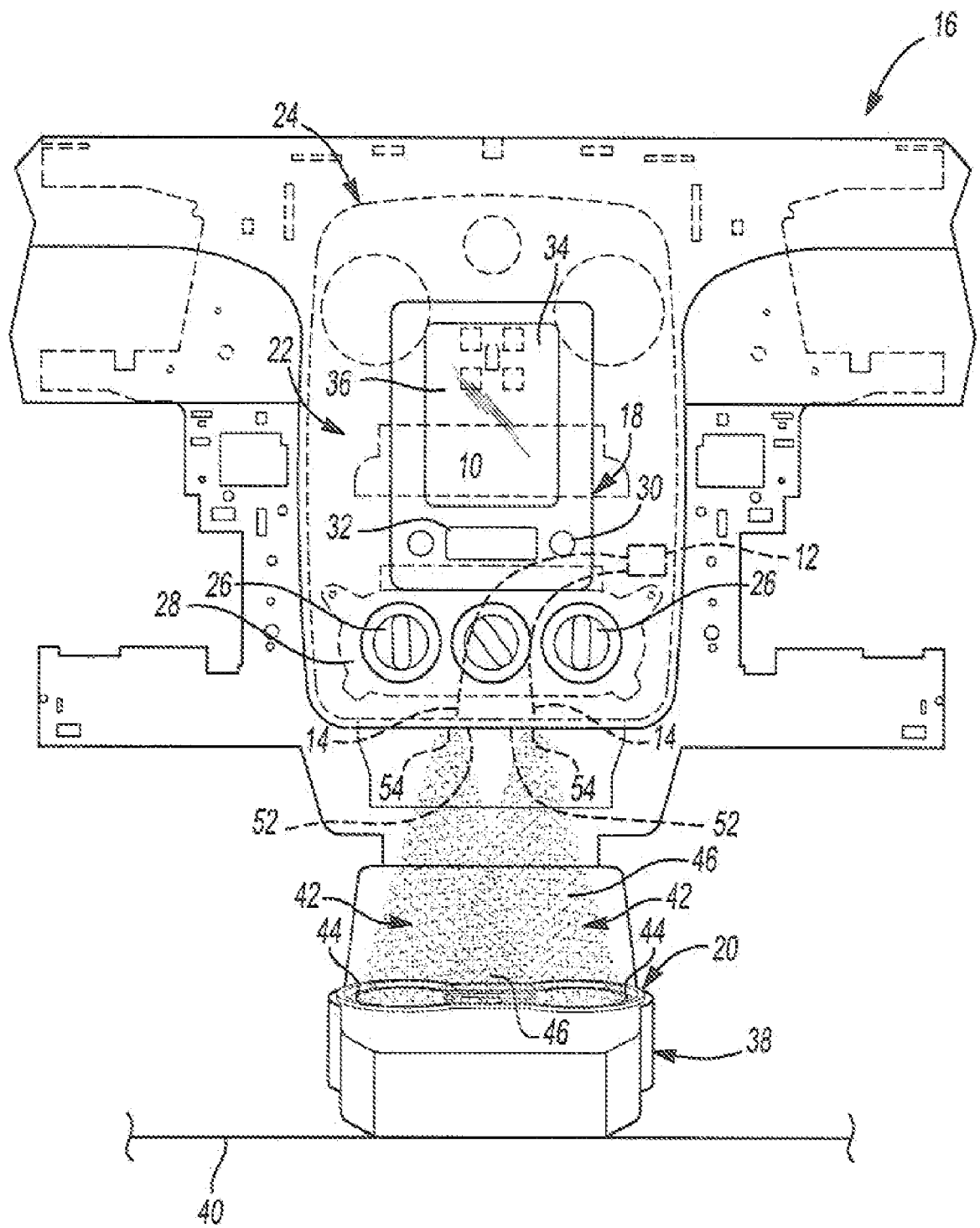
FIG. 2 is a front view of the vehicle accessory light of FIG. 1.

With particular reference to FIGS. 1 and 2, the display 18 of the vehicle 16 is shown incorporated into a center bezel 22 of an instrument panel 24. The center bezel 22 may include a series of controls for use by an operator in controlling various subsystems of the vehicle 16. For example, the center bezel 22 may include a series of controls 26 that control a heating, ventilation, and air conditioning system 28 (HVAC), a series of controls 30 that control an audio system 32, and a series of controls 34 that control a graphical user interface 39 (GUI). The GUI 36 may be a subcomponent of a navigation system such as, for example a global positioning system.

The vehicle 16 may also include a console 38 disposed adjacent to the center bezel 22 of the instrument panel 24. The console 38 may be mounted to a floor pan 40 of the vehicle 16 and may include at least one vehicle accessory 42 such as a cup holder 44 and/or storage compartment 46. The vehicle accessory 42 may be disposed generally beneath the center bezel 22 of the instrument panel 24 such that the cup holder 44 and/or storage compartment 46 are positioned in close proximity to the center bezel 22. The cup holder 44 and/or storage compartment 46 may include at least one surface 48 having a reflective coating 50, which may be applied to the surface 48 of the vehicle accessory 42 so as to oppose the center bezel 22 of the instrument panel 24. While the console 38 is described as being disposed generally beneath the center bezel 22, the console 38 could alternatively be positioned above or adjacent to the center bezel 22.

With continued reference to FIGS. 1 and 2, the light system 10 is shown incorporated into the center bezel 22 of the instrument panel 24 and illuminates the HVAC controls 26, the audio system controls 30, and the GUI controls 34. The light source 12 may located within the center bezel 22 of the instrument panel 24 in close proximity to at least one of the HVAC controls 26, the audio system controls 30, and the GUI controls 34 such that light from the light source 12 is directed to and illuminates each of the controls 26, 30, 34.

While the light source 12 may provide at least one of the HVAC controls 26, audio system controls 30, and GUI controls 34 with light to illuminate each of the controls 26, 30, 34, light from the light source 12 may also be used to illuminate the vehicle accessory 42 disposed proximate to the center bezel 22 of the instrument panel 24. Specifically, the center bezel 22 may include at least one aperture 52 in communication with the light guide 14 of the lighting system 10 such that light received from the light source 12 may be directed through the center bezel 22 via the light guide 14 and at least one aperture 52.

While the center bezel 22 may include a single aperture 52 in communication with the light guide 14, the center bezel 22 will be described hereinafter and shown in the drawings as including a pair of apertures 52, with each aperture 52 in communication with the light source 12 via the light guide 14. In addition, while a pair of apertures 52 will be described hereinafter and shown in the drawings, the center bezel 22 may include more than two apertures 52.

The pair of apertures 52 are each in communication with the light source 12 via the light guide 14 such that light from the light source 12 is communicated through the pair of apertures 52 via the light guide 14. A color filter 54 may be positioned within the light guide 14 at any point along a length of the light guide 14 to illuminate the vehicle accessory 42 using a predetermined color. While the color filter 54 is described as being disposed within the light guide 14, the color filter 54 may alternatively or additionally be disposed proximate to or within the apertures 52. Furthermore, the color filter 54 may be disposed in only one of the apertures 52 or within only a portion of the light guide 14 to illuminate the vehicle accessory 42 using two different colors. If the lighting system 10 does not include a color filter 54 disposed within the light guide 14 or the apertures 52, light from the light source 12 illuminates the vehicle accessory 42 via the light guide 14 and apertures 52 at a color substantially the same as that emitted from the light source 12.

Figure 3:
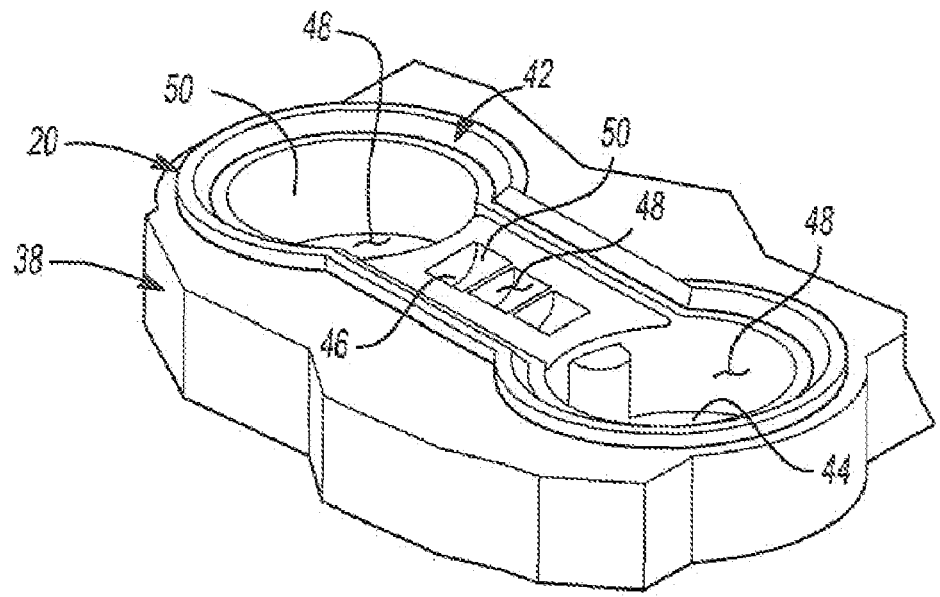
FIG. 3 is a perspective view of a vehicle accessory.
Figure 4:
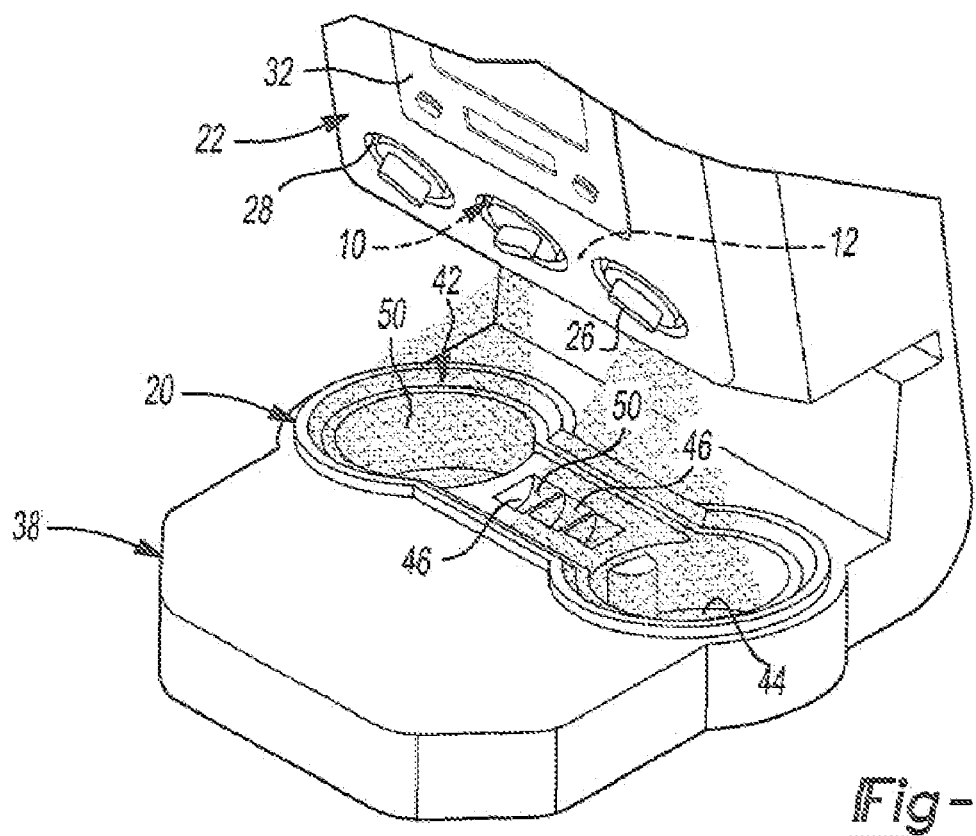
FIG. 4 is a perspective view of the vehicle accessory of FIG. 3 in an illuminated state.
Figure 5:
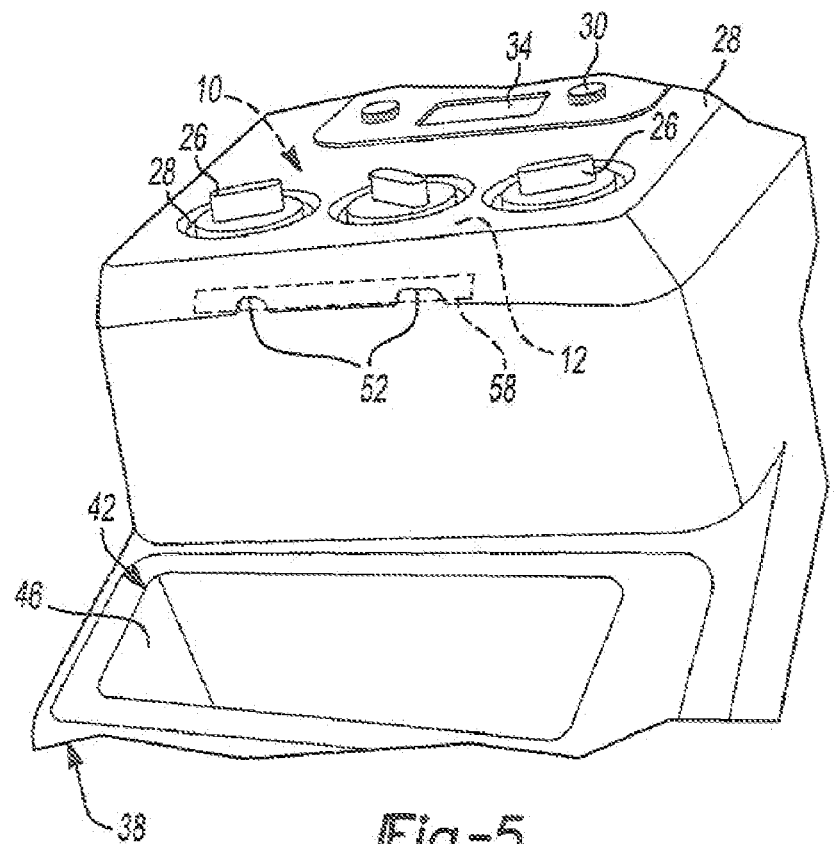
FIG. 5 is a bottom perspective view the vehicle accessory light of accessory light of FIG. 1.
Figure 6:
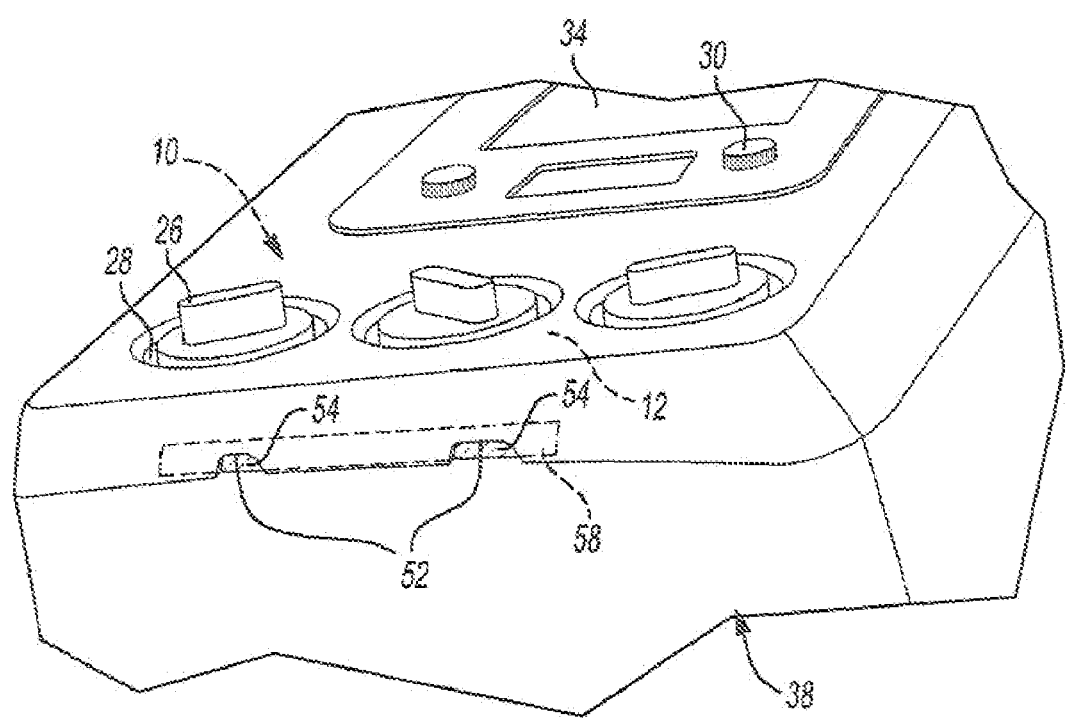
FIG. 6 is a bottom view of the vehicle accessory light of FIG. 1 including a color filter.

With particular reference to FIGS. 2-4, operation of the lighting system 10 will be described in detail. When the vehicle 16 is operated in dark conditions (i.e., at night, dusk, or in a tunnel, for example), power may be supplied to the light source 12 to illuminate the light source 12. Illumination of the light source 12 causes at least one of the HVAC controls 26, audio system controls 30, and GUI controls 34 to be illuminated. Illuminating the HVAC controls 26, audio system controls 30, and GUI controls 34 allows a user to see the controls 26, 32, 36 when the vehicle 16 is operated in dark conditions and therefore allows the user to control the HVAC system 28, audio system 32, and GUI 36.

When the light source 12 is illuminated, light from the light source 12 is directed towards the pair of apertures 52 by the light guide 14. If the light guide 14 and apertures 52 do not include a color filter 54, light from the light source 12 illuminates the vehicle accessory 42 at a color substantially the same as the color emitted from the light source 12. If the light guide 14 and/or apertures 52 includes a color filter 54, light from the light source 12 passes through the color filter 54 and illuminates the vehicle accessory 42 at a color dictated by the color filter 54.

In either configuration, light from the light source 12 is received at the pair of apertures 52 from the light guide 14 and is directed toward the vehicle accessory 42 by the apertures 52. The apertures 52 may include an opening size that is generally smaller than the vehicle accessory 42 to which the light from the light source 12 is directed. Because the center bezel 22 of the instrument panel is spaced apart from the console 38, light from each aperture 52 expands and illuminates substantially the entire vehicle accessory 42 upon reaching the vehicle accessory 42.

If the vehicle accessory 42 includes a cup holder 44, the pair of apertures 52 may be positioned such that each aperture 52 is aligned with a respective one of the cup holders 44. Furthermore, if a pair of cup holders 44 are provided, the apertures 52 and/or light guide 14 may be provided with two different color filters 54 to illuminate each of the cup holders 44 with a different color. Alternatively, the cup holders 44 may be illuminated using the same color, as provided by the light source 12, or as dictated by a color filter 54 disposed within either or both of the light guide 14 and apertures 52.

If the vehicle accessory 42 is a storage compartment 46, the apertures 52 may be positioned generally above the storage compartment 46 such that light from the light source 12 illuminates the entire storage compartment 46. As described above with respect to the cup holders 44, the storage compartment 46 may be illuminated using various color filters 54 to provide the storage compartment 46 with a multi-colored illumination or a single-colored illumination.

If the surface 48 of the vehicle accessory 42 includes a reflective coating 50, the reflective coating 50 may cooperate with light from the light source 12 to reflect light received from the light source 12 via the light guide 14 and apertures 52. The reflective coating 50 may cooperate with the light source 12 and/or color filter 54 to provide the vehicle accessory 42 with a desired illumination.

While the lighting system 10 is described as being illuminated in conjunction with illumination of a center bezel 22 of an instrument panel 24, the lighting system 10 may alternatively be controlled by a control system 56. The control system 56 may include a slide lever 58 that is selectively translated relative to the center bezel 22 to selectively block the pair of apertures 52 and prevent light from the light source 12 from passing through the center bezel 22 and reaching the vehicle accessory 42.

The control system 56 may also include an intelligent controller 60 in communication with the slide lever 58 such that movement of the slide lever 58 relative to the center bezel 22 is electronically controlled. In either configuration, an occupant may control illumination of the vehicle accessory 42 through actuation of the slide lever 58 relative to the center bezel 22. For example, when the slide lever 58 is moved away from the apertures 52 into a retracted position, light from the light source 12 is permitted to pass through the apertures 52 and illuminate the vehicle accessory 42. When the slide lever 58 is moved into a blocking position, the slide lever 58 prevents light from the light source 12 from passing through the apertures 52 and illuminating the vehicle accessory 42. Movement of the slide lever 58 from the retracted position to the blocking position may be controlled by applying a force directly to the slide lever 58 and/or by applying a force to an actuation mechanism 62 such as, for example, a pushbutton or touchpad, that electronically moves the slide lever 58 relative to the center bezel 22 of the instrument panel 24.

Providing the light system 10 with control system 56 allows an occupant to selectively illuminate the vehicle accessory 42 and therefore allows the occupant to only illuminate the vehicle accessory 42 when desired. Furthermore, when the slide lever 58 is in the blocking position, light diverted toward the apertures 52 will reflect off of the slide lever 58 and may improve the ability of the light source 12 to illuminate the HVAC controls 26, audio system controls 30 and/or GUI controls 34.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lighting system for a vehicle, wherein the vehicle includes a display panel and a vehicle accessory adjacent to the display panel, the lighting system comprising a light source disposed within the display panel and operable to backlight said display panel with light from said light source, said display panel including at least one aperture selectively permitting light from said light source to pass through said display panel to illuminate the vehicle accessory.

2. The lighting system of claim 1, wherein said at least one aperture is positioned to permit light from said light source to directly impinge upon the vehicle accessory.

3. The lighting system of claim 1, wherein said at least one aperture includes a color filter.

4. The lighting system of claim 1, wherein said display panel includes at least one control device operable to control a subsystem of the vehicle.

5. The lighting system of claim 4, wherein said subsystem is at least one of a heating, ventilation, and air conditioning system, an audio system, and a graphical user interface.

6. The lighting system of claim 1, wherein the vehicle accessory is disposed beneath said display panel.

7. The lighting system of claim 1, further comprising a console disposed beneath said display panel and supporting the vehicle accessory.

8. The lighting system of claim 1, wherein the vehicle accessory is a cup holder.

9. The lighting system of claim 1, wherein the vehicle accessory includes a coating reflecting light from said light source.

10. The lighting system of claim 1, wherein said display panel is mounted to an instrument panel of the vehicle.

11. The lighting system of claim 1, further comprising a control system that selectively prevents light from passing through said display panel when said light source is backlighting said display panel.

12. A vehicle comprising:
a display panel;
a vehicle accessory disposed adjacent to said display panel; and
a lighting system including a light source disposed within said display panel for backlighting the display panel and selectively illuminating said vehicle accessory.

13. The vehicle of claim 12, wherein said display panel includes at least one aperture that allows light from said light source to pass through said display panel and directly impinge upon said vehicle accessory.

14. The vehicle of claim 13, wherein said at least one aperture includes a color filter.

15. The vehicle of claim 12, further comprising an instrument panel and a console disposed beneath said instrument panel, said instrument panel supporting said display panel and said console supporting said vehicle accessory.

16. The vehicle of claim 12, wherein said vehicle accessory is a cup holder.

17. The vehicle of claim 12, wherein said vehicle accessory reflects light from said light source.

18. The vehicle of claim 12, wherein said vehicle accessory is disposed beneath said display panel.

19. The vehicle of claim 12, wherein said vehicle accessory is a storage compartment.

20. The vehicle of claim 12, further comprising a control system that selectively prevents said lighting system from illuminating said vehicle accessory when said lighting system backlights said display panel.

* * * * *